United States Patent [19]
Harrison et al.

[11] Patent Number: 5,452,158
[45] Date of Patent: Sep. 19, 1995

[54] MAGNETIC HEAD GIMBAL HAVING TWO DEGREES OF FREDOM WITH LOCALIZED TORSION AND BENDING FOR RESPECTIVE DEGREES OF FREEDOM

[75] Inventors: Joshua C. Harrison; Kevin P. Hanrahan, both of Santa Barbara, Calif.

[73] Assignee: Applied Magnetics Corporation, Goleta, Calif.

[21] Appl. No.: 181,572

[22] Filed: Jan. 13, 1994

[51] Int. Cl.[6] .............................................. G11B 5/48
[52] U.S. Cl. ................................................ 360/104
[58] Field of Search ...................................... 360/104

[56] References Cited

U.S. PATENT DOCUMENTS 5,079,660  1/1992  Yumura ............................... 360/104
5,282,102  1/1994  Christianson ....................... 360/104

*Primary Examiner*—A. J. Heinz
*Attorney, Agent, or Firm*—Robert N. King; Robert M. Wallace

[57] ABSTRACT

A gimbal embodying the present invention couples the magnetic head to the load beam through torsion fingers which twist to permit rotational motion of the head in one degree of freedom (e.g., pitch or roll) and bending arms which bend to permit rotational motion of the head in the other degree of freedom. Lateral separation of localized bending regions of the arms, and a dimple, serve to prevent motion of the head in other rotational and translational degrees of freedom.

19 Claims, 4 Drawing Sheets

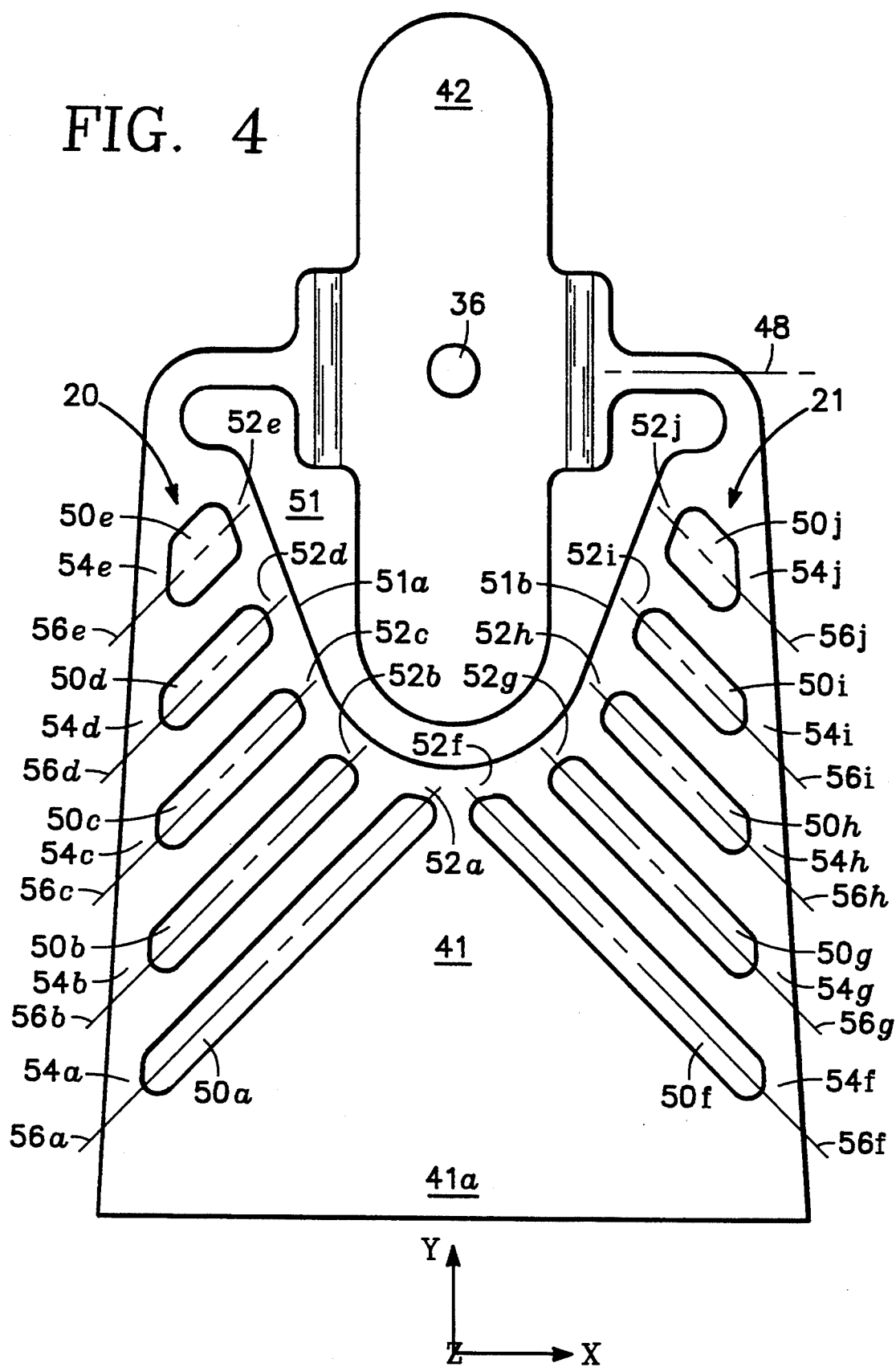

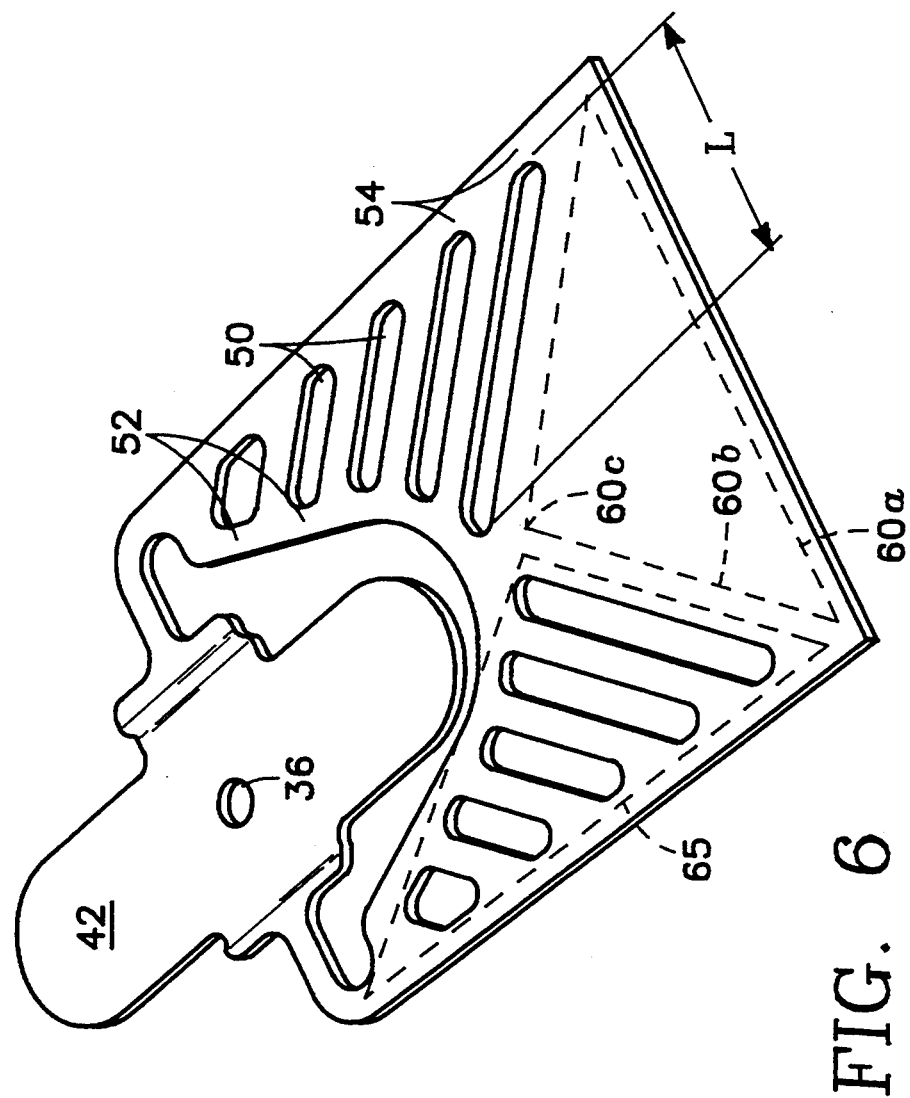
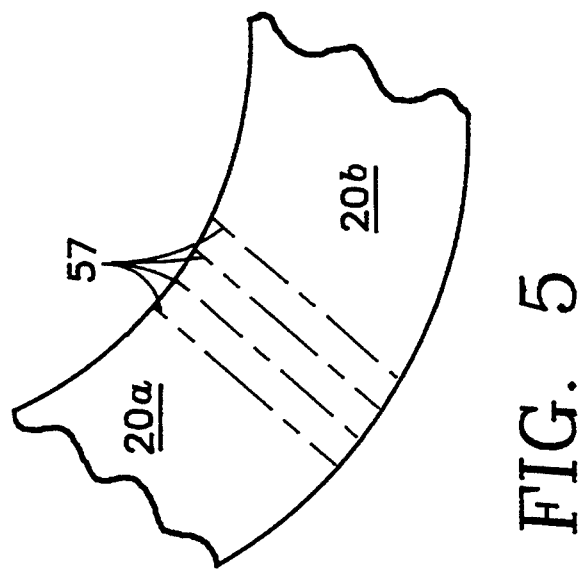
FIG. 6
FIG. 5

MAGNETIC HEAD GIMBAL HAVING TWO DEGREES OF FREDOM WITH LOCALIZED TORSION AND BENDING FOR RESPECTIVE DEGREES OF FREEDOM

BACKGROUND OF THE INVENTION

1. Technical Field

The invention is related to magnetic recording heads in a direct access storage device such as a disk drive, and in particular to gimbals and suspension assemblies employed therewith.

2. Background Art

The recording head in a direct access storage device (DASD) is constrained to allow rotational motion about the x and y axis, and translation along the z axis (see FIG. 1), but to disallow translation along the x and y axis, and rotation about the z axis. In practice, complete selective rejection of the undesired motions is not possible, but is approximated by mounting the head on a small metal structure commonly called a "suspension assembly". The suspension assembly is comprised of two parts with distinct functions: the "load beam" and the "gimbal" (see FIG. 2).

The load beam provides high compliance to translation of the head along the z axis only, and forms an otherwise rigid link connecting the head to a positioning means, such as an actuator mounting block. The gimbal has high compliance to rotary motion of the head about the x and y axis ("pitch" and "roll" compliance, respectively) and comparatively low compliance to all other head motions. Thus, the ideal gimbal would have zero rotational stiffness about the x and y axis, infinite rotational stiffness about the z axis, and infinite translational stiffnesses along all three axis. The width of the ideal gimbal would not exceed that of the head in a rotary actuated DASD. If this design specification is satisfied, the head can be brought as close as possible to the disk inner diameter without gimbal interference with the spindle hub.

Practical gimbal designs attempt to approximate the ideal gimbal while minimizing cost and mass. Mass is minimized so as to allow a rotary actuator to impart accelerations to the DASD sub-assembly known as the head/gimbal assembly (HGA), consisting of the recording head and suspension assembly.

Prior gimbal designs that increased roll or pitch compliance to improve performance suffered a corresponding loss in lateral stiffness, which reduced overall performance. Accordingly there is a need for a gimbal which provides greater pitch and roll compliance without sacrificing lateral stiffness.

Increasing vertical stiffness of the gimbal for greater dimple preload force reduces the tendency of the dimple to slip across the load beam. However, such an increase in stiffness in prior gimbal designs has prevented an increase in roll and pitch compliance. Accordingly, there is also a need for a gimbal which provides greater dimple preload force without a corresponding sacrifice in roll and pitch compliance.

SUMMARY OF THE INVENTION

A gimbal embodying the present invention couples the magnetic head to the load beam through torsion fingers which twist to permit rotational motion of the head in one degree of freedom (e.g., pitch or roll) and bending arms which bend to permit rotational motion of the head in the other degree of freedom. In a preferred embodiment, the gimbal is composed of a flexure and a tongue, the flexure being connected at its base end to the load beam and the tongue being connected to the recording head. The flexure is divided by a first aperture into two bending arms, located between the torsion fingers and the base end of the flexure, and which bend in opposite directions to permit roll motion of the tongue. The torsion fingers connect the far end of the bending arms to the tongue. The bending arms are weakened by slotted apertures which are aligned to be parallel to predetermined contours of equal out-of-plane displacement of the bending arms under an enforced roll rotation of the tongue. These slotted apertures form localized regions of concentrated bending at their ends, and reduce the overall cross sectional area and cross sectional moment of inertia of the bending arm. Thus, the slotted apertures decrease the ability of the bending arm to resist bending motion, increasing the compliance of the gimbal to roll motion of the head. The localized bending regions are separated by the length of a corresponding slotted aperture, and the component of this separation in the x direction serves to increase the stiffness of the gimbal with respect to lateral translation of the head. Out-of-plane bends connect the torsion fingers to the tongue and hold the tongue out of the plane of the flexure to avoid interference between the load beam and the recording head. This separation between the plane of the load beam and the plane of the nearest surface of the recording head is maintained by a dimple of approximately hemispherical shape which is formed in either the tongue or the load beam. For pitch and roll rotation of the head, the tongue pivots on this dimple, and the shape of the dimple ensures that there is only point contact between the tongue and the load beam.

BRIEF DESCRIPTION OF THE DRAWINGS

FIG. 4 is a top view of the gimbal employed in the assembly of FIG. 3.

FIG. 5 is an enlarged perspective view of a small bent portion of the flexure of FIG. 4.

FIG. 6 is another perspective view of the gimbal of FIGS. 3 and 4.

DETAILED DESCRIPTION OF THE INVENTION

Figure 1A:
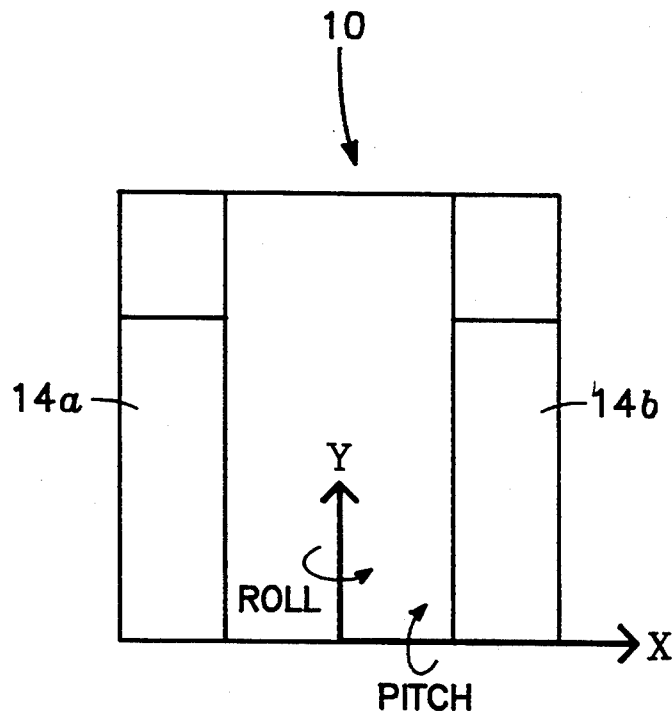
FIGS. 1A and 1B are bottom and side views, respectively, of a magnetic recording head.
Figure 1B:
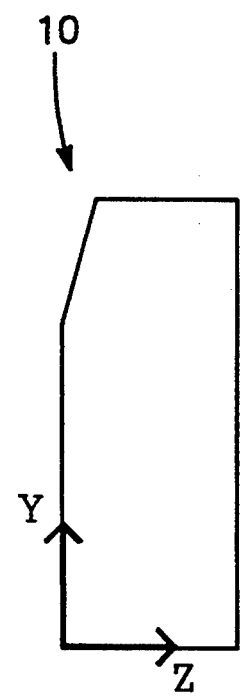
Figure 2:
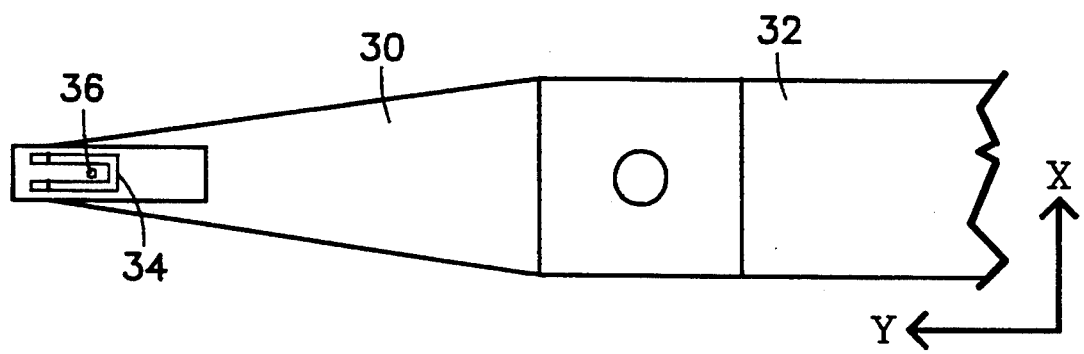
FIG. 2 is a bottom view of a magnetic recording head suspension assembly of the prior art.

Referring to FIGS. 1A and 1B, a magnetic recording head 10 (viewed from the bottom side in FIG. 1) includes an air bearing surface, such as rails 14a, 14b, on which it is supported by air pressure developed by the relative motion (along the y axis) of this surface and the surface of a spinning disk (not shown). Referring to FIG. 2, a suspension assembly (viewed from the bottom side in FIG. 2) includes a load beam 30 coupled at its base end to a positioning apparatus 32 and coupled at its far end to a gimbal 34 on which the magnetic recording head 10 is mounted. A dimple 36 on the gimbal 34 contacts the load beam 30 and holds the head 10 out of the plane of the load beam 30, preventing interference therebetween, and prevents vertical movement of the head 10 toward the beam 30. The dimple 36 pushes on the load beam 30 with sufficient preload force to resist dimple separation from the load beam when the head is not forced against the magnetic disk, as during the disk drive assembly process. FIG. 1 indicates the orientation of the x, y and z orthogonal axes relative to the head 10. The gimbal 34 permits the head 10 to pitch about the x axis and roll about the y axis (relative to the load beam 30) as it flies over the magnetic disk or media. Ideally, the gimbal prevents yaw about z axis and prevents translation along all three axes.

The dimple 36 maintains separation between the plane of the load beam 30 and the plane of the nearest surface of the recording head 10. The dimple 36 is of approximately hemispherical shape and is formed either on the load beam 30 or on the tongue 42. For pitch and roll rotation of the head, the tongue 42 pivots on the dimple 36, and the shape of the dimple 36 ensures that there is only point contact between the tongue 42 and the load beam 30.

Figure 3:
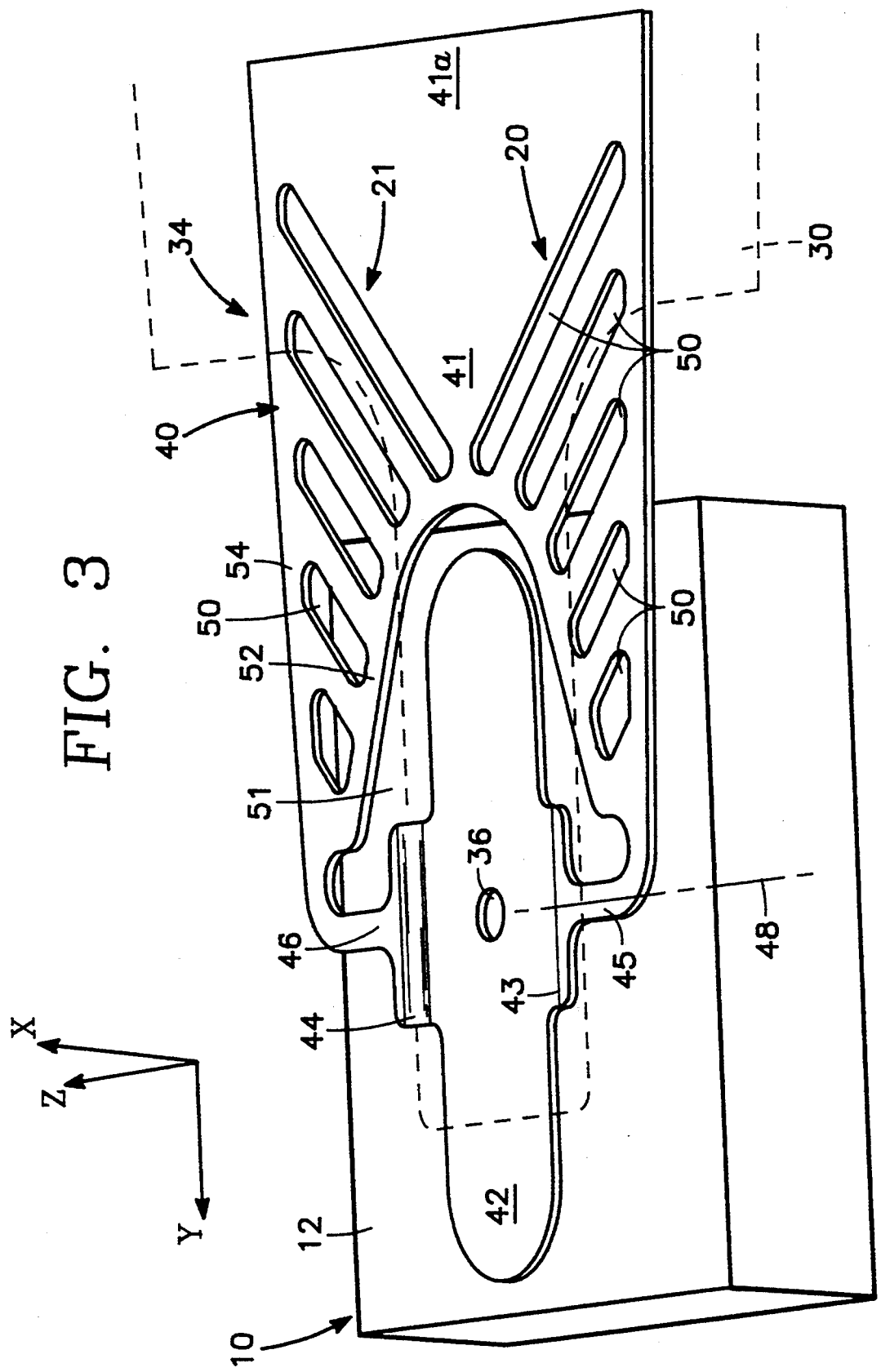
FIG. 3 is a perspective view of a magnetic recording head suspension assembly including a gimbal embodying the present invention.

Referring to FIG. 3, a gimbal 40 embodying the present invention replaces the conventional gimbal 34 of FIG. 2. FIG. 3 shows the gimbal 40 in perspective view from the top installed in a suspension assembly of the type illustrated in FIG. 2. FIG. 4 is a top view of the gimbal 40 alone. The gimbal 40 includes a thin planar flexure 41 and a thin planar tongue 42 depressed below the plane of the flexure 41 and connected to bending arms 20, 21 of the flexure 41 by out-of-plane bends 43, 44 and torsion fingers 45, 46. A top surface 12 of the head 10 is bonded to the bottom surface of the planar tongue 42 while the top surface of a base portion 41a of the flexure 41 is bonded (preferably spot-welded) to a bottom surface of the load beam 30. The load beam 30 is shown in phantom line in FIG. 3.

In order permit the head 10 to more easily pitch (rotate about the x axis) and roll (rotate about the y axis) relative to the load beam 30 without surrendering lateral stiffness (resistance to translation along the x axis and yaw about the z axis), the invention employs localized torsion of the gimbal 40 for one type of rotation (e.g., pitch) and localized bending of the gimbal 40 for the other type of rotation (e.g., roll). In the preferred embodiment illustrated in FIGS. 3 and 4, pitch compliance is provided by twisting of the torsion fingers 45, 46 about a torsion axis 48, the arrows near the axis 48 indicating a positive pitch motion. Roll compliance is provided by localized bending of the bending arms 20, 21 of the flexure 41 near a plurality of slotted apertures 50 and an aperture 51 separating the tongue 42 from the flexure 41.

Each slotted aperture 50 is an elongate empty region or slot between a pair of localized bending regions 52, 54 of the flexure 41. The left and right bending arms 20, 21 (as viewed in FIG. 4) of the flexure 41 have apertures 50a–e and 50f–j, respectively. The apertures 50a–j are bounded by corresponding pairs of localized bending regions 52a–j, 54a–j, respectively. Each of the bending region pairs 52a–j, 54a–j bends about a corresponding bending axis 56a–j, respectively, with which the corresponding aperture is aligned for optimum compliance. The bending axes 56a–e and 56f–j are chosen to lie parallel to contours of equal out-of-plane displacement of the bending arms 20, 21 of the flexure 41, determined under an enforced roll displacement of the tongue 42.

In order to permit a positive roll motion of the head 10, the bending region pairs 52a–e, 54a–e of the "left" bending arm 20 bend upwardly in the plane of the drawing as indicated by the arrows—so that the "left" side of the tongue 42 rises upwardly out of the plane of FIG. 4—while the bending finger pairs 52f–j, 54f-j of the "right" bending arm 21 bend downwardly as indicated by the arrows—so that the "right" side of the tongue 42 falls down out of the plane of FIG. 4. For a negative roll motion of the head 10, the bending about the axes 56f–j is opposite to that indicated in FIG. 4.

In the preferred embodiment, the apertures 50a–j are elongate and are oriented such that their longitudinal axes coincide with corresponding bending axes 56a–j, respectively. The shapes of the apertures 50 and 51 affect the orientation of the bending axes 56. As stated above, the bending axes 56a–e and 56f–j are chosen to lie parallel to contours of equal out-of-plane displacement of the bending arms 20, 21 of the flexure 41, determined under an enforced roll displacement of the tongue 42. These bending axes tend to lie at complementary acute angles. Thus, as shown in FIG. 4, the apertures 50a–e on the left bending arm 20 are disposed at opposing acute angles relative to the apertures 50f–j on the right bending arm 21 in order to coincide with the respective bending axes 56. This feature maximizes the roll compliance of the flexure 41. FIG. 5 is an enlarged view of a small portion of the bending arm 20 having an in-plane portion 20a and a bent out-of-plane portion 20b whose bending is caused by a roll displacement of the tongue 42. The bending creates many infinitesimally-spaced imaginary contours 57 of equal out-of-plane displacement. It is along a chosen contour 57 that each aperture 50 is placed.

The apertures 50a–e and 50f–j are of progressively increasing lengths from the base portion 41a toward the torsion fingers 45, 46 so that all of the localized bending regions 52, 54 are of approximately the same width, (about 4 mils). However, on closer inspection, the precise aperture lengths are chosen so that the precise width of localized bending areas 52, 54 gradually decreases from the base portion 41a toward the torsion fingers 45, 46. This is done to increase the uniformity of bending strain and stress along the bending arms.

The pitch compliance provided by the torsion fingers 45, 46 relative to lateral stiffness, and the roll compliance provided by the bending arms relative to lateral stiffness, exceed that found in existing gimbals which utilize a dimple.

Lateral stiffness (resistance to yaw or rotation about the z axis and translation along the x and y axes) is optimized in the invention by the relatively large lateral separation L (FIG. 6) between localized bending regions 54 and localized bending regions 52, as well as the relatively short connection path between the bonding area 41a and the tongue 42. Bending region pairs under greatest stress from lateral loading of the tongue 42 are given the greatest lateral spacing L, reaching a maximum separation L at the base 41a on the order of half the width of the flexure. For optimum lateral stiffness, there is a truss structure inherent in the flexure of the invention, as indicated in FIG. 6. Referring to FIG. 6, a first truss support structure is indicated by the dashed-line triangle 60 having a base 60a extending laterally along the base 41a and two sides 60b, meeting at an apex 60c. A second truss support structure typical of each one of the arms 20, 21 is indicated by the second dashed-line triangle 65 in FIG. 6. The increased stiffness reduces or virtually prevents lateral motion of the dimple 36 across the surface of the load beam 30. In contrast, the gimbal of the Hutchinson Technology Type 19LSF has a comparatively long connection path which partially loops back on itself between the welding area (corresponding to the base portion 41a of FIG. 4) and the tongue (corresponding to the tongue 42 of FIG. 4).

The relatively short connection path of the gimbal 40 also increases the vertical stiffness (resistance to motion of the tongue 42 along the z axis relative to the load beam 30), which determines the force with which the dimple 36 is preloaded against the load beam 30.

In one implementation of the preferred embodiment of FIGS. 3 and 4, the gimbal 40 was integrally formed of 1.2 mil-thickness full hard stainless steel. The overall length from the back of the base portion 41a to the far tip of the tongue 42 was 122 mils, while the length between the base portion 41a and the far edge of the torsion fingers 45, 46 was 70 mils. The vertical displacement between the plane of the tongue 42 and the plane of the flexure 41 was 2 mils. The height of the dimple 36 in the tongue 42 was 2.5 mils, resulting in a dimple-to-load beam preload corresponding to a 0.5 mil enforced vertical displacement of the flexure after assembly. In order to maximize the angle by which the gimbal could roll or pitch before the material permanently yielded, the radii r at the corners of the apertures 50 were maximized, preferably all of these radii being 2 mils, while the radii R in the aperture 51 were all 3 mils. The width at the base portion 41a was 75 mils while the width at the torsion bars 63 mils. The length of the tongue was 70 mils and the width of the tongue was 20 mils. Each of the apertures 50a, e, f, j has four straight sides connected by four approximately quarter-round radii while each of the apertures 50b–d and 50g–i has three straight sides connected by two approximately quarter-round radii at one end and a half-round radius at the other end. The centerlines of the apertures 50 are spaced apart by about 8 mils along the bending arms 20, 21 of the flexure 41.

Analysis

Finite element models of the gimbal of the present invention (FIGS. 3 and 4) and two popular state-of-the-art gimbal designs, were generated using 3-D shell elements. The attachment of the gimbal to the load beam by spot-welding was modeled as a rigid cantilever support using shell edge constraints. The dimple/load beam contact was modeled as a point constraint (fixed translation, free rotation) for static analysis of pitch and roll compliance, and was omitted for analysis of lateral stiffness. A p-type finite element solver (RASNA Applied Structure) was employed for static linear analysis of the structural response under applied pitch, roll, and yaw moments, lateral forces, and vertical forces (applied to the magnetic recording head bonding surface). Model results and performance measures were compared, when possible, to published specifications for the state-of-the-art gimbal designs. These comparisons allowed the finite element model mispredictions to be identified for the state-of-the-art gimbals, and then to be used to adjust the respective predictions for the gimbal of FIGS. 3 and 4.

Results

The advantages and key features of the gimbal of FIGS. 3 and 4 are quantified in Table I. Table I summarizes the results of a finite element model based comparison between the gimbal of FIGS. 3 and 4 and two state-of-the-art gimbal designs which are currently in common use in the DASD industry, namely the Hutchinson Technology Type 19 LSF gimbal and the Hutchinson Technology Type 16 gimbal. The first column of Table I, labelled $K_{lat}/K_{pitch}$, gives the ratio of lateral stiffness to pitch stiffness in Newtons/mm of lateral deflection per micro-Newton-meters per degree of pitch rotation of the head 10 relative to the load beam 30. The second column, labelled $K_{lat}/K_{roll}$, gives the ratio of lateral stiffness to roll stiffness in Newtons/mm of lateral deflection per micro-Newton-meters per degree of roll rotation. The third column, labelled $K_{lat}$, gives the lateral stiffness in Newtons per millimeter of lateral deflection of the head 10 relative to the load beam 30. The fourth column, labelled $K_{vertical}$, gives

TABLE I

| | $K_{lat}/K_{pitch}$ | $K_{lat}/K_{roll}$ | $K_{lat}$ (N/mm) | $K_{vertical}$ (N/mm) | $K_{dimpsep}$ (N/mm) | Max Pitch (deg) | Max Roll (deg) |
|---|---|---|---|---|---|---|---|
| Ideal Gimbal | ∞ | ∞ | ∞ | ∞ | large | large | large |
| HTI Type 16 | 12.5 | 27.3 | 120 | ~2 | N/A | 5.44 | 8.38 |
| HTI Type 19 | 6.25 | 5.0 | 12.5 | ~∞ | 0.056 | 5.25 | 12.3 |
| Invention - data adjusted by differences between HTI reported data (Type 16) & model results | 13.27 | 14.5 | 45.0 | ~∞ | .125 | 6.64 | 10.24 |
| Invention - data adjusted by differences between HTI reported data (Type 19 & model results | 43.66 | 14.51 | 53.7 | ~∞ | 0.125 | 6.64 | 10.24 | the vertical stiffness in Newtons per millimeter of upward deflection of the head toward the load beam. The fifth column, labelled $K_{dimpsep}$, gives the force of resistance of the gimbal to downward deflection in Newtons per millimeter of deflection of the dimple 36 away from the load beam 30. The sixth and seventh columns, labeled "Max Pitch" and "Max Roll", respectively, state the maximum bend angle of the head relative to the load beam before permanent yielding of the flexure. Comparison of the displacement and stress fields resulting from the finite element analysis allows several conclusions to be drawn.

It should be noted that the HTI Type 16 gimbal uses only torsion for both roll and pitch compliance and therefore requires a structure which surrounds the head. Such a structure gives rise to significant hub interference. The HTI Type 19 gimbal uses only bending for both roll and pitch compliance and has a parallelogram structure which is particularly susceptible to lateral displacement.

Conclusions

1) The gimbal of the present invention provides a higher ratio of pitch compliance (and roll compliance) to lateral compliance than state-of-the-art gimbal designs which also utilize a dimple. This feature increases the robustness of the HGA to shock in the lateral direction, reducing dimensional instability caused by material yielding and any associated stiffness variation from strain hardening. This feature is also important in resisting dimple slippage with respect to the load beam, preventing track-to-head misalignment and associated data loss.

2) The gimbal of the present invention provides higher resistance to relative motion in the z-direction, between the head and the load beam, than state-of-the-art gimbals which do not utilize a dimple. This feature eliminates the possibility of head corner interference with the load beam, or load beam interference with the disk, due to such relative motion. Such interference due to relative motion in the z-direction has been a problem with state-of-the-art gimbals which do not utilize a dimple.

3) The gimbal of the present invention provides greater dimple preload for the same dimple/load beam interference, than other state-of-the-art gimbals. This preload increase serves to further reduce dimple slippage with respect to the load beam under lateral shock.

4) The gimbal of the present invention can be deflected further in the pitch direction without yielding than state-of-the-art gimbals (and further in the roll direction than state-of-the-art gimbals which do not utilize a dimple). This increase in allowable range of motion decreases the likelihood that the gimbal will be damaged during HGA or DASD assembly, leading to higher manufacturing yield and lower cost per disk drive.

Another advantage of the invention is that, in the assembled disk drive, the gimbal of the present invention allows the magnetic recording head to get closer to the inner hub of the rotating disk media than state-of-the-art gimbals which do not utilize a dimple. This feature allows maximum utilization of the space available on the disk surface, leading to higher achievable DASD data capacities.

A further advantage is that the gimbal of the present invention allows unrestricted access to (and viewing of) the trailing edge of the recording head along the z-axis, a desirable feature which is rare in state-of-the-art gimbals which utilize a dimple and non-existent in state-of-the-art gimbals which do not utilize a dimple. This feature can be important in measurements of head-to-disk spacing fluctuation and in the construction of out-of-plane wire service loops.

The invention has been described with reference to a preferred embodiment which uses torsion to achieve pitch compliance and bending to achieve roll compliance. However, other embodiments of the invention can reverse the functions of torsion and bending so that torsion may be used to achieve roll compliance while bending may be used to achieve pitch compliance.

While the slotted apertures 50 have their longitudinal axes aligned with the bending axes 56 of the flexure 41 so as to lie at the acute angles illustrated in FIG. 4 for optimum roll compliance, other embodiments of the invention may have the apertures 50 lying at a different angle or not aligned with the bending axes 56.

While the invention has been described in detail by specific reference to preferred embodiments, it is understood that variations and modifications thereof can be made without departing from the true spirit and scope of the invention.

What is claimed is:

1. A magnetic head gimbal, comprising:
   a flexure having a base portion locatable relative to a load beam;
   a tongue connectable to a recording head;
   means in said flexure for coupling said tongue to said base portion, comprising:
   torsion fingers providing localized torsion to permit rotation of said tongue relative to said base portion in a first rotational degree of freedom, and
   bending arms providing localized bending to permit rotation of said tongue relative to said base portion in a second rotational degree of freedom.

2. The gimbal of claim 1 wherein said tongue and base portion are integrally formed of a thin metal sheet having a first aperture separating said tongue from said base portion and defining an edge of each of said torsion fingers and said bending arms, and having a plurality of second apertures defining localized concentrated bending regions in said bending arms adjacent said second apertures.

3. The gimbal of claim 2 further comprising out-of-plane bends between said torsion fingers and said flexure whereby said tongue when unrotated is in a plane below a plane of said flexure.

4. The gimbal of claim 3 further comprising a dimple in one of (a) said tongue and (b) said load beam, extending toward the other of said tongue and said load beam and having a height greater than the spacing between the planes of said flexure and said tongue.

5. The gimbal of claim 2 wherein said bending arms tend to bend along multiple bending axes and wherein each of said plurality of second apertures are axially aligned to be parallel with respective ones of said bending axes.

6. The gimbal of claim 5 wherein each of said second apertures is elongate and has a pair of ends adjacent a respective pair of said localized bending regions, each pair of said localized bending regions defined by a lateral separation, wherein said lateral separation corresponds to a lateral stiffness of said flexure.

7. The gimbal of claim 6 wherein said lateral separation near said base portion is approximately one half of the width of said flexure.

8. The gimbal of claim 5 wherein said bending axes are axially aligned to be parallel with contours of equal out-of-plane displacement along said bending arms, said contours corresponding to an enforced rotation of the tongue along said second degree of freedom.

9. The gimbal of claim 5 wherein:
   said first aperture defines a distal end of said flexure and defines two longitudinal edges and one end of said tongue;
   said second apertures are disposed in two groups thereof along each of two of said bending arms which lie between said distal end and said base portion of said flexure so that some of said localized bending regions are between respective ones of said second apertures and said first aperture and remaining localized bending regions are between respective ones of said second apertures and opposite edges of said bending arms; and
   said torsion fingers are disposed at opposite ends of said first aperture near opposite edges of said tongue and extend transversely relative to said flexure.

10. The gimbal of claim 1 wherein said tongue has a proximal portion surrounded by said first aperture and a distal portion extending beyond said flexure but not beyond the extent of said head, and wherein said tongue pivots about an axis of rotation of said torsion fingers passing through an intermediate portion of said tongue between said proximal and distal portions thereof.

11. A magnetic head gimbal, comprising:

a flexure having a base portion locatable relative to a load beam;

a tongue connectable to a recording head;

means in said flexure for coupling said tongue to said base portion, comprising:

torsion fingers capable of twisting to permit rotation of said tongue relative to said base portion in one degree of freedom; and bending arms capable of bending to permit rotation of said tongue relative to said base portion in a second degree of freedom;

wherein said tongue and base portion are integrally formed of a thin metal sheet having a first aperture separating said tongue from said base portion and defining an edge of each of said torsion fingers and said bending arms, and having a plurality of second apertures defining localized concentrated bending regions in said bending arms adjacent said second apertures;

wherein said bending arms tend to bend along multiple bending axes and wherein each of said plurality of second apertures are axially aligned to be parallel with respective ones of said bending axes;

wherein said first aperture defines a distal end of said flexure and defines two longitudinal edges and one end of said tongue;

wherein said second apertures are disposed in two groups thereof along each of two of said bending arms which lie between said distal end and said base portion of said flexure so that some of said localized bending regions are between respective ones of said second apertures and said first aperture and remaining localized bending regions are between respective ones of said second apertures and opposite edges of said bending arms;

wherein said torsion fingers are disposed at opposite ends of said first aperture near opposite edges of said tongue and extend transversely relative to said flexure;

wherein said two groups of second apertures and the respective bending axes lie at approximately complementary angles near respective ones of said opposite side edges of said flexure; and wherein said second apertures in each of said two groups are elongate and are of progressively decreasing lengths from said base portion to said distal end whereby said localized bending regions are all of approximately similar widths.

12. The gimbal of claim 11 wherein said tongue is connectable at its surface facing away from said flexure to the head and said base portion of said flexure is connectable at its surface facing away from said tongue to said load beam.

13. A gimbal for coupling a magnetic head to a load beam, comprising:

a planar bendable flexure extending between proximal and distal ends thereof, said flexure being connectable to said load beam near said proximal end;

a tongue separated from said flexure by a first aperture therein and connectable to said head, said tongue having a proximal portion partially surrounded by said flexure and a distal portion extending beyond the distal end of said flexure;

a pair of twistable torsion fingers extending across the distal end of said flexure adjacent said first aperture toward and coupled to respective sides of said tongue, said torsion fingers providing localized torsion to permit rotation of said tongue in one of two rotational degrees of freedom and said flexure having pair of bending arms defined by the outside edges of said flexure and the inside edges of said first aperture providing localized bending to permit rotation in the other one of said two rotational degrees of freedom.

14. The gimbal of claim 13 further comprising a pair of out-of-plane bends connected between torsion fingers and respective side edges of said tongue and holding said tongue in a plane displaced from a plane of said flexure.

15. The gimbal of claim 13 wherein said bending arms comprise plural apertures defining localized bending regions along opposite side edges of said flexure adjacent corresponding ones of said plural apertures and localized bending regions along an inner edge of said first aperture adjacent corresponding ones of said plural apertures.

16. The gimbal of claim 15 wherein each of said localized bending regions and corresponding ones of said plurality of apertures are axially aligned to be parallel with respective bending axes of said bending arms.

17. The gimbal of claim 16 wherein said bending axes are axially aligned to be parallel with contours of equal out-of-plane displacement along said bending arms, said contours corresponding to an enforced rotation of the tongue along said other degree of freedom.

18. The gimbal of claim 13 wherein said planar flexure has a truss structure having a base extending laterally along the width of said proximal end and an apex adjacent said first aperture.

19. A gimbal for coupling a magnetic head to a load beam, comprising:

a planar flexure extending between proximal and distal ends thereof, said flexure being connectable to said load beam near said proximal end;

a tongue separated from said flexure by a first aperture therein and connectable to said head, said tongue having a proximal portion partially surrounded by said flexure and a distal portion extending beyond the distal end of said flexure;

a pair of torsion fingers extending across the distal end of said flexure adjacent said first aperture toward and coupled to respective sides of said tongue, said torsion fingers twisting for rotation in one of two rotational degrees of freedom and said flexure bending for rotation in the other one of said two rotational degrees of freedom;

wherein said flexure comprises a pair of bending arms defined by the outside edges of said flexure and the inside edges of said first aperture;

wherein said bending arms comprise plural apertures defining localized bending regions along opposite side edges of said flexure adjacent corresponding ones of said plural apertures and localized bending regions along an inner edge of said first aperture adjacent corresponding ones of said plural apertures;

wherein each of said localized bending regions and corresponding ones of said plurality of apertures are axially aligned to be parallel with respective bending axes of said bending arms; and wherein said plurality of apertures lie along opposing acute angles along opposing side edges of said flexure and are of progressively increasing lengths from said proximal end to said distal end of said flexure.

* * * * *